April 11, 1961  E. J. BALS  2,979,269
SPRAYING APPARATUS FOR TREATING CROPS AND PESTS
Filed Feb. 28, 1956  3 Sheets-Sheet 1
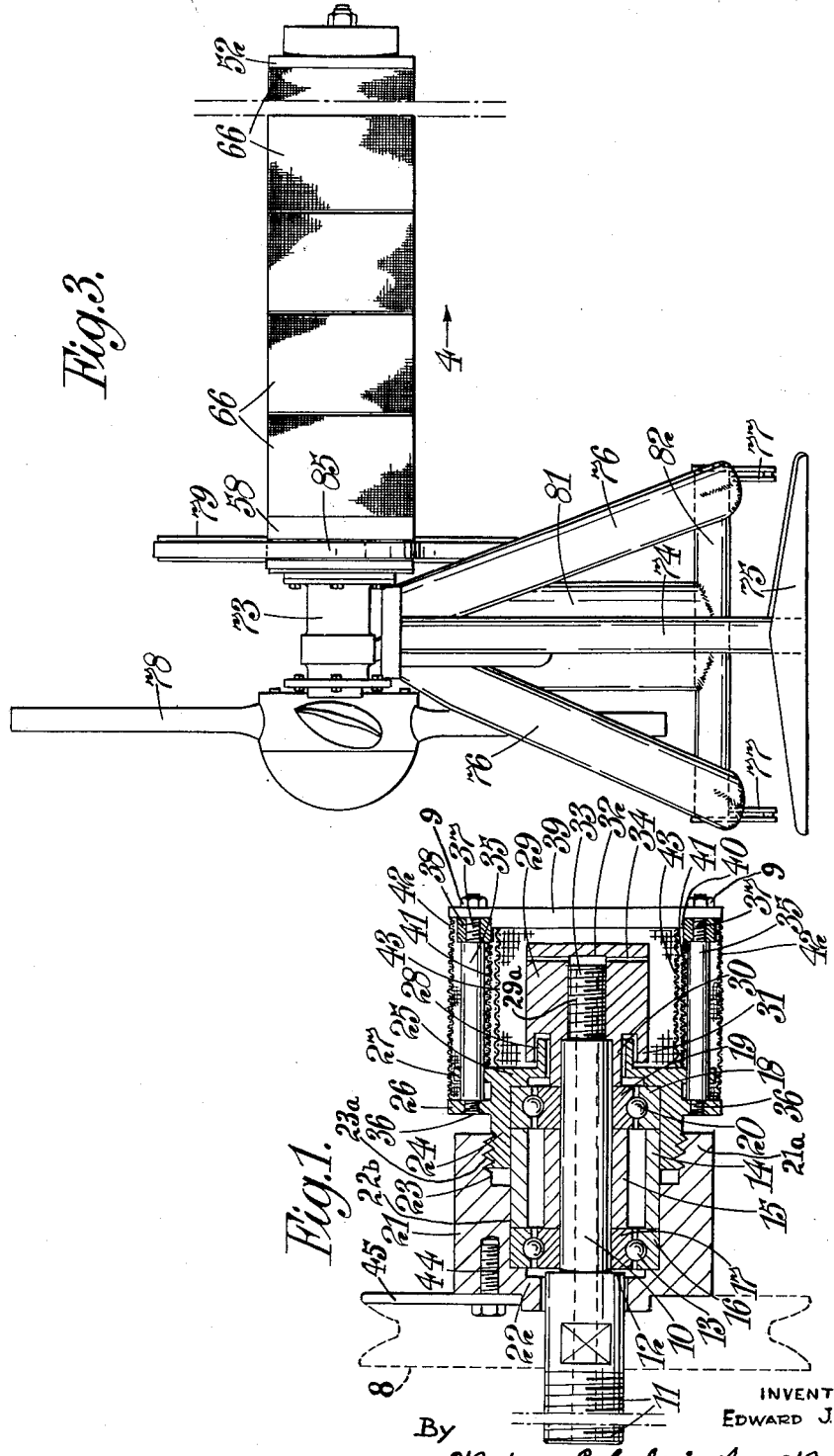
INVENTORS
Edward J. Bals
By
Watson, Cole, Grindle & Watson
ATTORNEYS

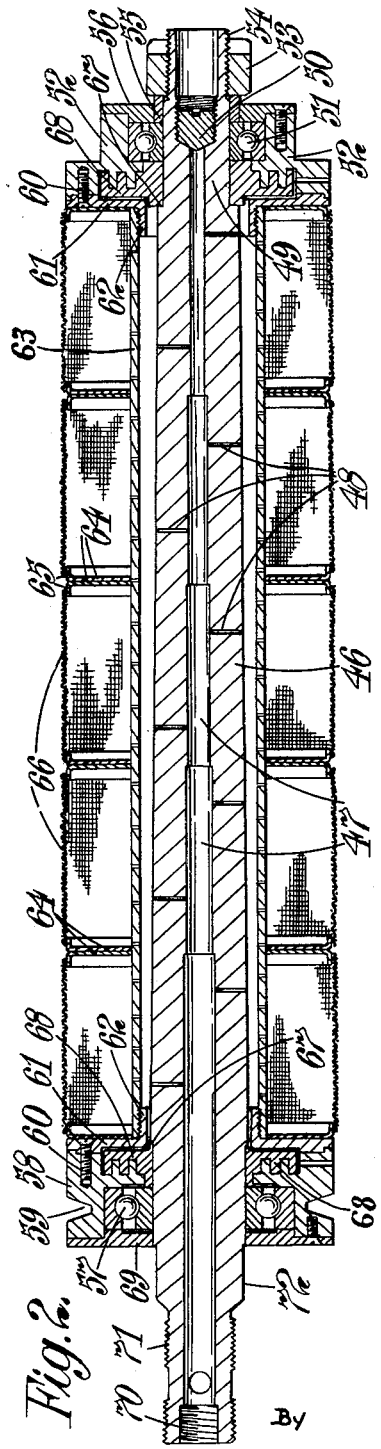

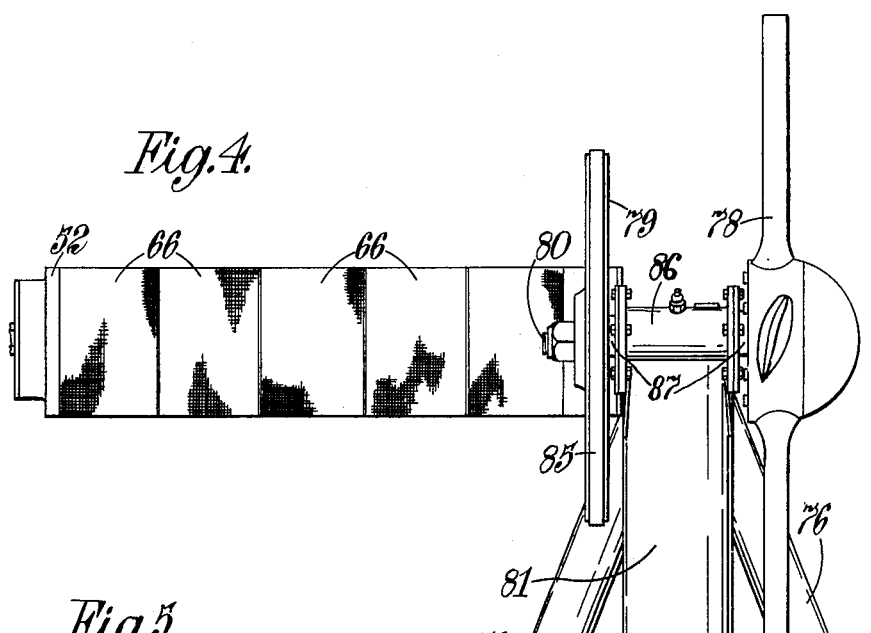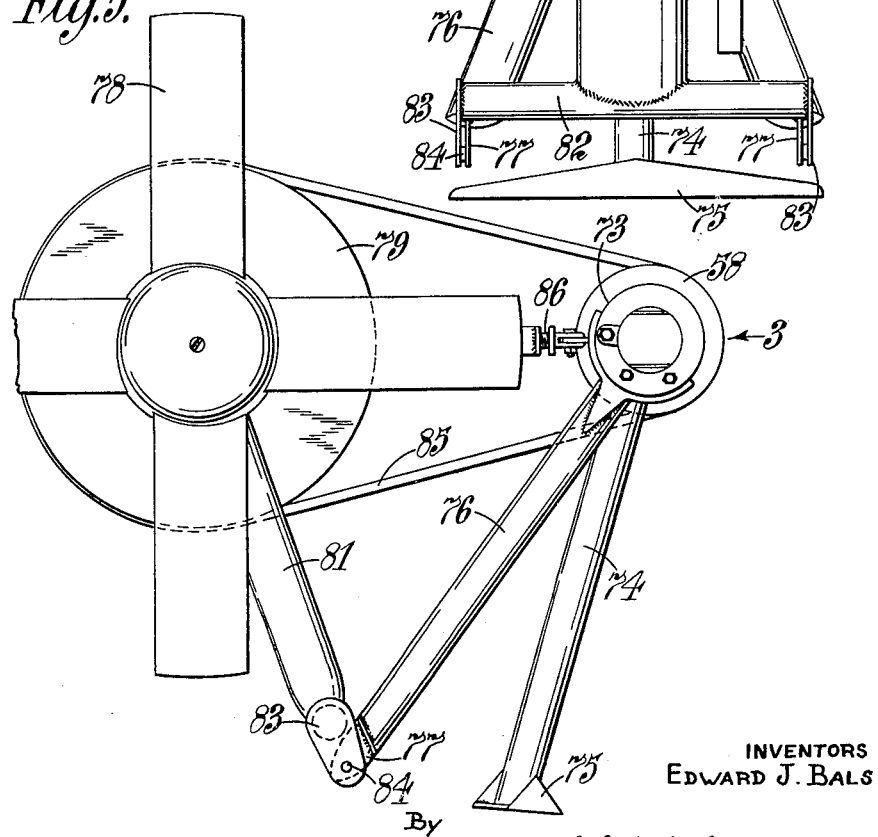

United States Patent Office 2,979,269
Patented Apr. 11, 1961

2,979,269
SPRAYING APPARATUS FOR TREATING CROPS AND PESTS

Edward Julius Bals, Battersea, London, England, assignor to Micron Sprayers Limited, Birmingham, England, a British company Filed Feb. 28, 1956, Ser. No. 568,387

Claims priority, application Great Britain Feb. 28, 1955

10 Claims. (Cl. 239—77)

This invention relates to spraying apparatus for treating crops and destroying pests from the air. The more usual form of apparatus when used with an aircraft comprises a fixed spray pipe having atomizing nozzles spaced apart along its length and mounted athwartships beneath the aircraft and supplied with suitable spraying fluid under pressure. Such an apparatus produces considerable air drag and is of substantial weight. An object of this invention is to avoid and minimise these disadvantages.

According to this invention a crop spraying apparatus comprises in combination with an aircraft of an atomizer having a rotatable hollow perforated body, means for supplying spraying fluid to the inside of said perforated body and means for rotating said body at such a speed that the fluid in passing through the perforations is atomized. An apparatus of this kind is of comparatively small bulk and thus presents only a little wind resistance. The term "hollow perforated body" is meant to include a structure having holes, slots or other forms of apertures.

Vortices are formed by the passage of an aircraft through the air which vortices commence at certain locations on the aircraft such as the wing tips in a winged aircraft, and the engines. A feature of this invention is that the atomizers are disposed at or near those locations. By these means the resulting clouds of mist are comparatively widely spread.

The means for rotating the perforated body may comprise an air impeller, either driving said perforated body direct or through a suitable transmission. Alternatively the means for rotating the perforated body may comprise a separate motor also either directly connected to said body or through a suitable transmission.

In one construction according to the invention an atomizer for spraying crops is characterised in that the rotatable hollow perforated body comprises at least one sleeve formed from wire mesh which sleeve has located therein said means for supplying the spraying liquid.

In an arrangement in which a number of nested coaxially arranged wire mesh sleeves are provided the innermost sleeve may have a larger mesh than the outer sleeve.

Preferably an outer sleeve is spaced away from the adjacent sleeve.

The means for supplying the spraying liquid may comprise a fixed spray head having a number of radially extending spray passages.

In an alternative form of construction an elongated rotatable perforated sleeve is provided and a spray pipe is arranged within the sleeve so as to extend along the length thereof. The elongated sleeve may be mounted on bearings carried by said pipe. The elongated sleeve may be formed from a number of cylindrical sections arranged end to end on a supporting structure rotatably mounted on said pipe. The supporting structure may comprise a tube formed with or having attached thereto radially extending flanges at its ends secured to housings for bearings engaging the spray pipe and annular plates spaced apart along the tube and having the cylindrical perforated portions attached to their peripheries. One of said housings may be formed as a V pulley providing a part of a belt and pulley drive for the perforated body.

A supporting structure may be attached to one end of said spray pipe.

The supporting structure has a part thereof which is mounted on a spindle having fixed thereto a propeller and driving pulley. The latter part of the supporting structure is adjustable in relation to the part carrying the perforated body so as to enable the tension on the belt to be adjustable.

The following is a more detailed description of two alternative forms of atomizer according to the invention and suitable for attachment to an aircraft, reference being made to the accompanying drawings in which:

Figure 1 is a section through one form of atomizer,

Figure 2 is a section through another form of atomizer,

Figure 3 is a side elevation on a reduced scale of the atomizer showing it in position on its mounting, Figure 4 is a side elevation looking from the opposite side of the atomizer to that of Figure 3, and Figure 5 is a partial end elevation looking from the left of Figure 3.

The atomizer comprises a hollow spindle 10 externally threaded at one end 11 for attachment to a bracket which is secured to the aircraft so that the spindle extends in a fore and aft direction. The spindle is stepped externally to provide a shoulder 12 against which rests a ball race 13. The spindle beyond the ball race is provided with two concentrically arranged spacing sleeves 14, 15 which are arranged respectively to abut the inner and outer races 17, 16 of the ball race and also to engage the inner and outer races 19, 18 of the second ball race 20. A cup shaped body 21 having a hole 22a in the bottom 22 thereof is passed over the spindle so that the interior wall 22b of the cup engages the outer race 16 of the first said ball bearing 13. The mouth 21a of the cup shaped body is enlarged at 23 and is provided with internal screw threads 23a which are engaged by the rim 24 of a second and smaller cup shaped sleeve or body 25 which accommodates the second ball bearing 20 and a part of the outer spacing sleeve 14. The second cup shaped body is provided with two axially spaced radially extending flanges 26, 27 and at its centre is formed with an axially extending hollow boss 28. The internal diameter of the hollow boss is considerably larger than the spindle 10 which projects through it. The projecting end of the spindle is externally threaded at 33 and receives a nut 29 having a reduced portion 30 which projects through the hollow boss 28 and engages the inner race 19 of the second ball bearing 20. The nut 29 is also provided with a rim portion 31 which extends around the outer surface of the hollow boss 30. The threaded bore 29a of the nut is closed at 32 at the outer end and is of such a length as to extend beyond the end of the screw threaded spindle leaving an internal space from which radially extend a number of passages 34.

As already indicated the second cup shaped body part 25 is provided with two outwardly directed flanges 26, 27 spaced axially apart. The outermost flange 27 is provided with a number of holes which accommodate the ends of a number of pillars 35 having reduced screw threaded ends which engage threaded holes in the inner flange 26. The other ends of the pillars are also reduced in diameter at 37 and extend through holes in a ring 38, the outer diameter of which is substantially the same as the diameter of the flange 27, while the inner surface of the ring projects inwardly from the pillars. Certain of the reduced extremities of the pillars extend through holes in a cover plate 39 which has a spigot portion 40 which lies within the ring 38. Another part of the plate overlies the outer face of the ring and projects outwardly from its periphery. The projecting ends of the pillars are screw threaded to receive securing nuts 9.

Before the ring and cover plates are placed in position a sleeve 41 of wire mesh is disposed within the pillars and rests against the outer face of the outer flange 27. The ring is then placed in position and an inner sleeve 43 of larger mesh is arranged within the ring so as to abut the outer face of the outer flange and an outermost sleeve 42 of wire mesh arranged to encircle the ring and the outermost flange and to abut against the outer face of the inner flange 26. The cover plate 39 is then clamped in position thus holding the various sleeves of wire mesh in position.

The outer face of the first said cup shaped member 21 may be drilled and tapped to receive securing screws 44 by which either an impeller 45 or pulley 8 as shown in dotted lines in Figure 1 driven by an impeller is secured thereto.

The atomizer shown in Figure 2 comprises a spray pipe 46 having a stepped bore 47 and narrow radial passages 48 extending outwardly from each portion of the stepped bore. The end of the spray pipe containing the narrow bore is reduced at 49 and the end of the bore is closed by a screw threaded plug 50. The reduced end of the spray pipe is supported in a ball bearing 51 which is located within a housing 52. The ball bearing is retained in the housing by a nut 53 which engages a threaded end 54 of the reduced portion of the spray pipe and bears against the end of a spacing sleeve 55 the other end of which abuts against the inner race of the ball bearing. The housing is closed by a cover plate 56. Similarly the other end of the spray pipe is supported in a ball bearing 57 arranged in a housing 58 shaped to provide a V pulley 59. The two housings 52 and 58 each have secured to them, by screws 60, an annular plate 61 having a cylindrical externally threaded flange 62 at the inner edge thereof which threaded flanges are engaged by the internally threaded ends of a perforated or apertured sleeve or tube 63.

Spaced apart along the tube are number of annular plates 64 having rim portions 65 surrounding their peripheries, thus providing a number of pairs of spaced annular plates. Each pair of spaced annular plates have secured thereto at least one sleeve of metal gauze 66. As will be seen the spray pipe is provided near each end thereof with a shoulder 67 against which abuts one part 68 of a labyrinth seal the other part of which labyrinth seal is formed on the inner face of each of the housings 52, 58. Each labyrinth seal prevents the spray liquid from creeping along the spindle into the bearings. The bearing housing 58 is closed by a cover plate 69.

The end of the spray pipe projects beyond this cover plate 69 and is provided with threaded portions 70, 71 by which the spray pipe may be attached to a support and to a supply pipe through which it receives spray liquid under pressure. The end of the spindle is also provided with a cylindrical portion 72 which is engaged by a bore of a hollow boss 73 secured to the upper end of an upright 74 having a foot 75 arranged to rest on a part of the surface of the aircraft. Secured also to the hollow boss are two legs 76 which diverge as they extend downwardly and each is provided with a lug 77 at its lower extremity. A propeller 78 and a pulley 79 are fixed to a spindle 87 and arranged one on either side of a bearing 86 which accommodates the spindle. Extending downwardly from the bearing is an upright 81 having a cross piece 82 secured to its lower end which cross piece has lugs 83 at its extremity overlying the lugs 77. The two pairs of lugs may be arranged to straddle the spar of a wing of the aircraft and be drilled to receive a pivot pin 84 adapted to extend through matching holes in the spar and lugs. Thus the upright 81 may be swung in relation to the part 76 thereby adjusting the tension of the belt 85 which surrounds the two pulleys. This swinging movement may be imparted by a screw jack arrangement 86 connected between the boss 73 or upright 81 or between parts secured thereto. As previously indicated the propeller might be mounted directly on the housing 58 in which case the pulley 79 and the bearing 80 could be dispensed with or again in either arrangement the propeller could be replaced by an electric motor. Although the invention is described for attachment to the wing of an aircraft it can be attached to other parts and could also be used with a helicopter or even on a land vehicle.

I claim:

1. A liquid spraying apparatus for crops comprising a fixed hollow supply head for the liquid to be sprayed and adapted for attachment to a support, a gauze drum rotatably and coaxially mounted on the fixed supply head, said head having at least one passage formed therein directed outwardly towards the inner surface of the gauze drum, and an air impeller connected to said gauze drum.

2. A liquid spraying apparatus according to claim 1 wherein said supply head comprises a fixed spindle having an axial bore communicating with said outwardly directed passage and at one end a terminal portion adapted for the introduction of liquid into said bore, said terminal portion comprising the means for feeding said liquid, a sleeve is rotatably mounted on the spindle and is attached to said gauze drum and an air impeller is connected to said sleeve and comprises said driving element.

3. A liquid spraying apparatus for crops comprising a fixed hollow supply head for the liquid to be sprayed and adapted for attachment to a support, a gauze drum rotatably and coaxially mounted on said fixed supply head, said head having at least one passage formed therein directed outwardly towards an inner surface of the gauze drum, a pulley connected to said gauze drum, a rotatably mounted air impeller, a second pulley connected to said air impeller, and a belt encircling said pulleys.

4. A liquid spraying apparatus for crops comprising a fixed hollow supply head for the liquid to be sprayed and including a perforated pipe, a supporting bracket to which one end of said pipe is secured, a gauze drum rotatably and coaxially mounted on said supply head, the perforations in said pipe being directed outwardly towards the inner surface of said gauze drum, a pulley rotatably supported by said pipe and secured to the end of said gauze drum adjacent said bracket, an arm secured to said bracket, an air impeller rotatably mounted on said arm, a second pulley connected to said impeller, and a driving belt encircling the two pulleys.

5. A liquid spraying apparatus according to claim 4 and further comprising an adjusting member, said arm being mounted for pivotal movement relatively to said bracket and engaging with said adjusting member to enable the distance between the pulleys to be adjusted.

6. A liquid spraying apparatus for crops comprising a fixed hollow supply head for the liquid to be sprayed, said supply head being adapted for attachment to a support and including a perforated pipe, a gauze drum rotatably and coaxially mounted on said pipe and comprising a number of gauge cylinders arranged end to end, the inner surface of said drum being contacted in use by a spray of liquid issuing from the perforations in said pipe, and a driving element connected to said gauze drum.

7. A liquid spraying apparatus according to claim 6, wherein bearings are arranged on said pipe and said gauze drum also comprises an apertured tube having at its ends flanges supported by said bearings, said flanges supporting the outer edges of said gauze cylinders and spaced annular plates are mounted on said tube to support the remaining edges of said gauze cylinders.

8. A liquid spraying apparatus for crops comprising a fixed hollow supply head including a perforated pipe for the liquid to be sprayed, said supply head being adapted for attachment to a support, a gauze drum comprising a number of nested wire mesh sleeves rotatably and coaxially mounted on said pipe, said pipe being arranged in use to direct a spray of said liquid onto the inner surface of said gauze drum, and a driving element connected to said gauze drum.

9. A liquid spraying apparatus according to claim 8, wherein the outermost of said nest of sleeves is spaced away from the next adjacent sleeve.

10. A liquid spraying apparatus according to claim 8, wherein the innermost of said nest of sleeves is composed of coarser wire mesh than the remainder of said sleeves.

References Cited in the file of this patent

UNITED STATES PATENTS

| | | |
|---|---|---|
| 923,856 | Kestner | June 8, 1909 |
| 1,724,627 | Varnau | Aug. 13, 1929 |
| 1,887,416 | Matlack | Nov. 8, 1932 |
| 2,056,296 | Robertson | Oct. 6, 1936 |

FOREIGN PATENTS

| | | |
|---|---|---|
| 302,980 | Great Britain | Dec. 24, 1928 |
| 647,394 | Great Britain | Dec. 13, 1950 |